United States Patent [19]
May

[11] 3,922,998
[45] Dec. 2, 1975

[54] WARNING DEVICE FOR STALLED VEHICLES

[76] Inventor: Sam H. May, 8888 W. Jewell Ave., Lakewood, Colo. 80226

[22] Filed: June 24, 1974

[21] Appl. No.: 482,276

[52] U.S. Cl............ 116/40; 40/125 H; 40/129 C; 116/63 P
[51] Int. Cl.²........................................ B60Q 1/52
[58] Field of Search............ 116/40, 63 P, 63 R; 160/84 H, 84 V; 40/125 C, 125 G, 125 H, 125 N, 125 R, 129 C; 74/521

[56] References Cited
UNITED STATES PATENTS

| | | | |
|---|---|---|---|
| 1,336,381 | 4/1920 | Schacht | 116/40 |
| 1,467,896 | 9/1923 | Juvet | 40/125 G |
| 1,567,539 | 12/1925 | Morimoto | 116/40 |
| 3,208,173 | 9/1965 | Shank | 40/129 C |

*Primary Examiner*—S. Clement Swisher
*Assistant Examiner*—Denis E. Corr
*Attorney, Agent, or Firm*—Bertha L. MacGregor

[57] ABSTRACT

Disclosed herein is a warning device for stalled vehicles which comprises a lazy-tongs type frame, signal means made of flexible material attached at its upper and lower ends to the frame and overlying one face of the frame, and means connected to the lower end of the frame mounting the device on the roof of a vehicle. The flexible material forming the signal has an extra length at its upper edge depending from said upper edge on the other face of the frame, for wrapping around the device when the frame is collapsed for storage.

5 Claims, 4 Drawing Figures

WARNING DEVICE FOR STALLED VEHICLES

This invention relates to a warning device for stalled or disabled vehicles, designed to provide a signal to following vehicle drivers that the vehicle on which the warning device is mounted is stalled.

One of the objects of the invention is to provide a device easily mountable on and demountable from the top of a vehicle, and plainly visible to approaching cars.

Another object is to provide a compact device which is self contained, extensible to operating condition and easily contractible to collapsed condition.

Another object of is to provide means in the signal for packaging the device when not in use as a warning device.

Figure 1:
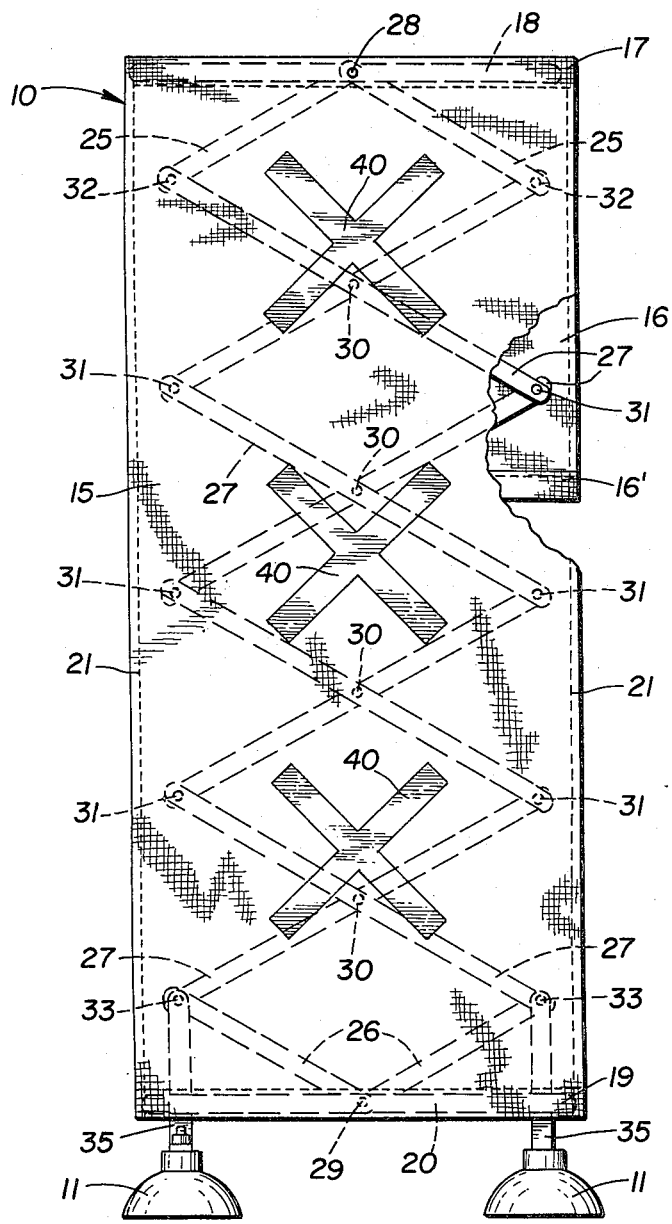
FIG. 1 is an elevational front view of a warning device for stalled vehicles embodying my invention.

In the embodiment of the invention shown in the drawings, the signal device 10 is detachably mounted by suction cups 11 on the roof of a vehicle 12. The signal or flag portion of the device is a rectangularly shaped piece of fabric or other suitable flexible material 15 integral with or connected to an extra length 16 of the material which is as wide as the signal portion 15 and about half its length, depending loosely from the upper end of the portion 15. The free edge of the material 16 is hemmed at 16'. An upper pocket 17 extends across the width of the signal fabric 15 between its upper edge and the extra material 16. A metal or other rigid bar 18 is inserted in the pocket 17. The pocket 17 may be formed by stitching a strip of material on said upper end of the signal 15. A lower pocket 19 is provided on the lower edge of the signal 15 by hemming, for reception of a metal or other rigid bar 20. The side edges of the signal 15 may be hemmed as indicated at 21, or the edges may be selvage edges.

A lazy-tongs type of frame is employed for supporting the signal fabric 15. The frame comprises two short upper bars 25, two short lower bars 26, and eight longer intermediate bars 27, each made of relatively thin metal or other suitable rigid material. The two short bars 25 are connected pivotally at one end by a rivet 28, and the two short bars 26 are pivotally connected at one end by rivet 29. Rivets 30 connect the longer intermediate frame bars 27 together in crossed pairs pivotally midway between their ends, and each of said bars 27 is pivotally connected to another intermediate bar by rivets or screws 31. The upper ends of two of the intermediate bars 27 are riveted pivotally to the shorter bars 25 as indicated at 32. The lower ends of two of the intermediate bars 27 are riveted to the shorter bars 26 as indicated at 33.

The upper and lower bars 18 and 20, in the pockets 17 and 19, respectively, are attached midway between their ends to the lazy-tongs type frame. The upper bar 18 is connected to the frame by the same rivet 28 which pivotally joins the two shorter bars 25. The lower bar 20 is connected to the frame by the same rivet 29 which pivotally joins the two shorter bars 26.

The suction cups 11 are pivotally attached to the frame by vertical arms 35, said arms being attached to the frame by the same rivets 33 which pivotally join the lower short bars 26 to intermediate bars 27.

The signal 15 may be provided with reflector type crosses 40 or other marking for the purpose of attracting attention. The material of the signal 15 may be iridescent.

Figure 2:
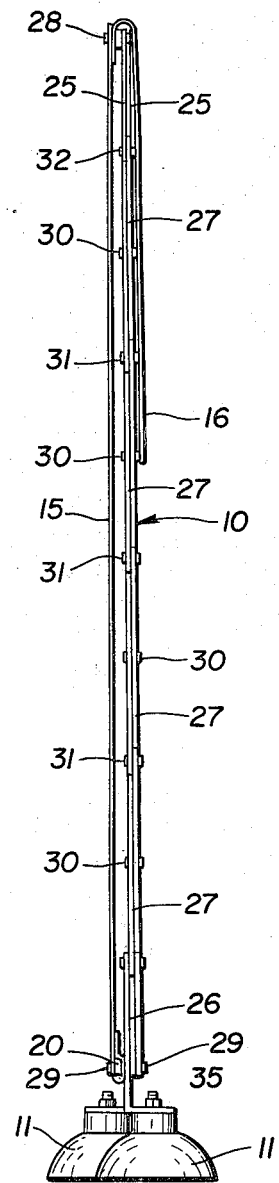
FIG. 2 is an elevational side view of the same.
Figure 3:
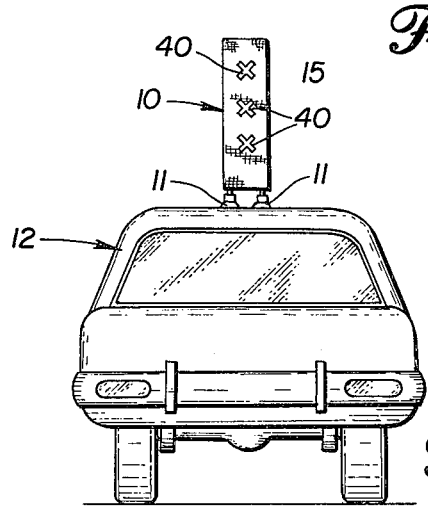
FIG. 3 is an elevational rear view of a vehicle and the warning device mounted on the roof of the vehicle.
Figure 4:
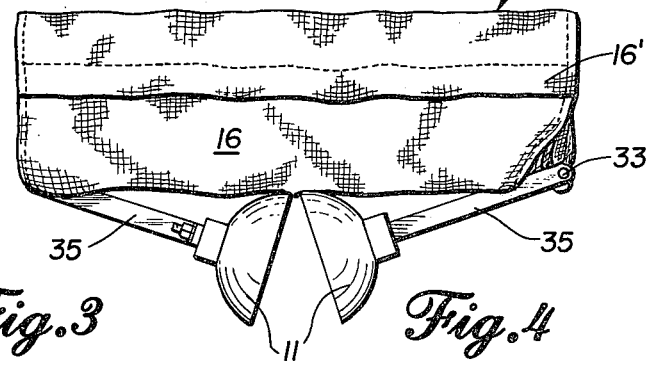
FIG. 4 is a plan view of the warning device in collapsed position, packaged in material which is part of the warning signal.

In use, the device appears as shown in FIGS. 1 and 2, with the frame and flexible signal material 15 extended, and the arms 35 in vertical positions rising from the suction cups 11 on the top of a vehicle. When not in use, the frame is contracted and the signal material 15 becomes automatically folded adjacent one face of the frame. The extra length of material 16 depending against the opposite face of the frame is wrapped around the collapsed device as shown in FIG. 4, and the arms 35 with suction cups 11 are moved pivotally into retracted positions adjacent the signal material 16 to form a compact package suitable for storing in the vehicle. The signal material 15 is held in rectangular form when extended due to the rigid bars 18 and 20 at its upper end lower ends, respectively, but is freely foldable otherwise because it is not fastened to the frame except by said bars 18 and 20.

I claim:

1. A warning device for stalled vehicles comprising
    a. a lazy-tongs type frame expansible for use as a signal material support,
    b. signal means made of flexible material attached to the upper and lower ends of the frame, and overlying one face of the frame,
    c. an extra length of said flexible material depending from the upper edge of said signal means material on the other face of the frame, and
    d. mounting means connected to the lower end of the frame for mounting the warning device on the roof of a vehicle.

2. The device defined by claim 1, in which the flexible material of the signal means is provided with a pocket extending transversely across each of its upper and lower ends, and a rigid bar in each of said pockets attached to the ends of the frame.

3. The device defined by claim 1, in which the extra length of flexible material is foldable over the frame and signal means when the frame is contracted.

4. The device defined by claim 1, in which the mounting means comprises a pair of vertical arms connected pivotally to the bottom end of the frame, and suction cups on the arms, said mounting means being pivotally movable to move the suction cups into contact with the bottom end of the frame for storage of the device.

5. A warning device for stalled vehicles comprising
    a. a lazy-tongs type frame expansible for use as a signal material support and collapsible for storage of the device,
    b. flexible signal material substantially rectangular in shape overlying one face of the frame,
    c. a rigid bar attached to each of the upper and lower ends of said signal material and attached to the respective upper and lower ends of the frame, and
    d. mounting means attached to the lower end of the frame including suction cups and vertical arms connecting the cups to the frame for mounting the device in vertical position on the roof of a vehicle, said frame comprising two short pivotally connected bars at each frame end and a plurality of crossed pivotally connected longer bars intermediate said short end bars, the pivotal connections between the short bars at each frame end also serving to connect the short bars to the rigid bars attached to the signal material.

* * * * *